(12) United States Patent
Morovic et al.

(10) Patent No.: US 9,706,084 B2
(45) Date of Patent: Jul. 11, 2017

(54) COLOR MAPPING

(71) Applicant: HEWLETT-PACKARD DEVELOPMENT COMPANY, L.P., Houston, TX (US)

(72) Inventors: Jan Morovic, Colchester (GB); Peter Morovic, Barcelona (ES); Peter J. Klammer, Corvallis, OR (US); James William Stasiak, Lebanon, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/446,725

(22) Filed: Jul. 30, 2014

(65) Prior Publication Data
US 2016/0034795 A1 Feb. 4, 2016

(51) Int. Cl.
*G06F 15/00* (2006.01)
*G06K 1/00* (2006.01)
*H04N 1/60* (2006.01)
*H04N 1/54* (2006.01)

(52) U.S. Cl.
CPC ............ *H04N 1/6033* (2013.01); *H04N 1/54* (2013.01); *G06K 2215/0094* (2013.01)

(58) Field of Classification Search
None
See application file for complete search history.

(56) References Cited

U.S. PATENT DOCUMENTS

| | | | |
|---|---|---|---|
| 5,425,978 A | 6/1995 | Berneth et al. | |
| 7,215,449 B2 | 5/2007 | Kriss | |
| 7,973,969 B2 | 7/2011 | Nakano | |
| 2002/0193956 A1* | 12/2002 | Van de Capelle | G01J 3/46 702/81 |
| 2003/0103234 A1 | 6/2003 | Takabayashi et al. | |
| 2007/0195347 A1 | 8/2007 | Momose et al. | |
| 2007/0248826 A1 | 10/2007 | Dutta | |
| 2007/0273908 A1 | 11/2007 | Hoshii | |
| 2008/0062193 A1 | 3/2008 | Olson | |

(Continued)

FOREIGN PATENT DOCUMENTS

WO WO-2012019081 2/2012

OTHER PUBLICATIONS

Hanna Haverinen, Inkjet-Printed Quantum Dot Hybrid Light-Emitting Devices—Towards Display Applications, University of Oulu, 2010 (84 pages).

(Continued)

*Primary Examiner* — Vincent Rudolph
*Assistant Examiner* — Michael Burleson
(74) *Attorney, Agent, or Firm* — HP Inc. Patent Department

(57) ABSTRACT

A method for generating a color mapping for a printing apparatus is described. The printing apparatus includes a plurality of colorants including a first colorant configured to reflect radiation having a first set of wavelengths and a second colorant configured to absorb radiation having a second set of wavelengths and emit radiation having a third set of wavelengths. The method includes obtaining spectral characteristics for the plurality of colorants, computing a gamut of colors available to the printing apparatus and determining a color mapping from an input color space to an output color space.

18 Claims, 4 Drawing Sheets

(56) References Cited

U.S. PATENT DOCUMENTS

| | | | |
|---|---|---|---|
| 2008/0111998 A1* | 5/2008 | Edge | H04N 1/6016 |
| | | | 358/1.9 |
| 2008/0259400 A1* | 10/2008 | Hersch | B41M 3/144 |
| | | | 358/2.1 |
| 2009/0045360 A1 | 2/2009 | Wosnick et al. | |
| 2009/0059252 A1 | 3/2009 | Coyle et al. | |
| 2009/0180127 A1 | 7/2009 | Yabe | |
| 2011/0096344 A1* | 4/2011 | Morovic | H04N 1/6033 |
| | | | 358/1.9 |
| 2011/0141104 A1 | 6/2011 | Tin | |
| 2012/0013635 A1 | 1/2012 | Beeman | |
| 2012/0043751 A1* | 2/2012 | Hersch | B41M 3/144 |
| | | | 283/92 |
| 2012/0086034 A1 | 4/2012 | Yuan et al. | |
| 2012/0105927 A1 | 5/2012 | Mestha | |
| 2012/0201030 A1 | 8/2012 | Yuan et al. | |
| 2012/0210274 A1 | 8/2012 | Pettigrew et al. | |
| 2012/0237740 A1 | 9/2012 | Hefty et al. | |
| 2013/0313595 A1 | 11/2013 | Naasani et al. | |
| 2014/0168426 A1* | 6/2014 | Andres | G07D 7/122 |
| | | | 348/143 |
| 2016/0032120 A1 | 2/2016 | Morovic | |
| 2016/0034795 A1 | 2/2016 | Morovic et al. | |

OTHER PUBLICATIONS

Galisteo-Lopez et al., Abstract—Studying Light Propagation in Self-Assembled Hybrid Photonic-Plasmonic Crystals by Fourier Microscopy, Apr. 2, 2012 (2 pages).

* cited by examiner

COLOR MAPPING

BACKGROUND

A typical printing apparatus is based on a subtractive color model and uses subtractive colorants such as, for example, C (cyan), M (magenta), Y (yellow) and K (black) inks. By overprinting images for each of the colorants, an image with a range of different colors can be printed. Colorants such as these mostly reflect light with a range of wavelengths in one part of the electromagnetic spectrum and mostly absorb light with a range of wavelengths in a different part of the electromagnetic spectrum. Such colorants partly reflect and partly absorb light at each wavelength. The relative proportion of incident light that is reflected and absorbed varies with wavelength. For example, a cyan colorant reflects incident light with wavelength in the green and blue parts of the electromagnetic spectrum and absorbs other, red-looking wavelengths of electromagnetic radiation. Subtractive colorants such as these reduce the amount of light which is reflected compared with the amount of light reflected by a bare substrate without the colorant arranged on it. There is thus a limit to the brightness of colors printed in this manner.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
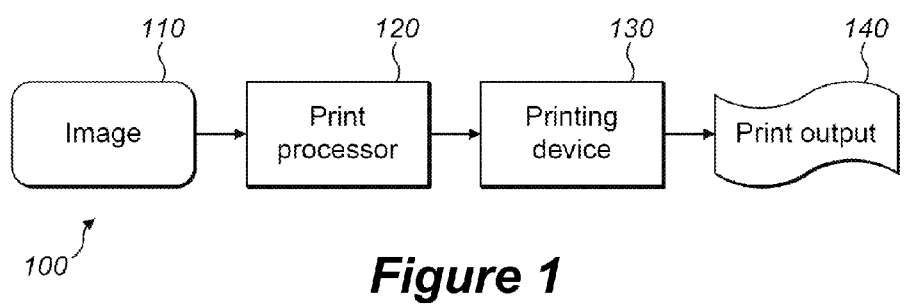
FIG. 1 is a schematic illustration showing a printing system for producing a print output according to an example.

In the following description, for the purpose of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. For example, in one case a color as observed visually by an observer may be related to a power or intensity spectrum of electromagnetic radiation across a range of visible wavelengths. In other cases a color model is used to represent a color at a lower dimensionality. For example, certain color models make use of the fact that color may be seen as a subjective phenomenon. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and Black (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color; the CIE 1976 (L*, a*, b*-CIELAB or 'LAB') color space, wherein three variables represent lightness ('L') and opposing color dimensions ('a' and 'b'); and the Yu'v' color space, wherein three variables represent the luminance ('Y') and two chrominance dimensions (u' and v'). Certain color spaces, such as RGB and CMYK may be said to be device-dependent, e.g. an output color with a common RGB or CMYK value may have a different perceived color when input to different imaging systems.

When working with color spaces, the term "gamut" refers to a multi-dimensional volume in a color space that represents color values that may be output by a given imaging system. A gamut may take the form of an arbitrary volume in the color space wherein color values within the volume are available to the imaging system but where color values falling outside the volume are not available. The terms color mapping, color model, color space and color gamut, as explained above, will be used in the following description.

In certain examples described herein, a plurality or set of colorants is used to provide a color gamut which is larger than that which can be obtained with a comparative set of colorants. The set of colorants includes at least a first colorant configured to reflect radiation having a first set of wavelengths and at least a second colorant configured to absorb radiation having a second set of wavelengths and emit radiation having a third set of wavelengths. In certain cases, the second and third set of wavelengths are from respectively different parts of the electromagnetic spectrum. In examples, the first colorant is a reflective colorant and the second colorant is an emissive colorant. The first and second colorants will be described in more detail below.

FIG. 1 shows schematically a printing apparatus 100 that may be used with the plurality of colorants. Image data corresponding to an image 110 is sent to a print processor 120. The print processor 120 processes the image data. It then outputs print control data that is communicated to a printing device 130. The printing device 130 is arranged to use a plurality of colorants to produce a print output 140 on a substrate. The term "colorant" as used herein refers to any colorant suitable for printing, including, amongst others a printing fluid, for example an ink, a gloss, a varnish or a coating, including fluids for liquid electrophotographic printing, and non-fluid printing materials, for example a toner, a wax or a powder used in laser printing or dry electrophotography, or a binder or fluid used in three-dimensional printing; any references to "ink" as used below include a colorant as so defined. For example, the printing device 130 may comprise an ink-jet printer with a number of print heads that are arranged to emit the plurality of colorants. The substrate may be any two or three dimensional substrate. The print output 140 comprises portions of colorant that are deposited onto the substrate by way of the printing device 130. In the example of FIG. 1, an area of the print output 140 may, depending on the image data 110, comprise a colorant overprint, in that a portion of a first deposited colorant may be overprinted with a portion of at least a second deposited colorant. The print control data has defined values for depositions with each combination of the colorants. In certain cases the print control data may comprise a distribution vector that specifies a distribution of colorant depositions, e.g. a probability distribution for each colorant and/or colorant combination for a pixel of a print image or, in other words, an area coverage vector for a set of colorant combinations or overprints.

The plurality of colorants for use with the printing apparatus in examples comprises at least a first colorant configured to reflect radiation having a first set of wavelengths, e.g. a reflective colorant. In such examples, the first colorant may absorb a portion of incident radiation at a given wavelength and reflect another portion of the incident radiation at that given wavelength. The relative proportions of radiation absorbed and reflected by the first colorant may be different for different wavelengths of incident radiation. As such spectra representing the relative proportions of reflectance and absorption across the visual spectrum may define the perceived "color". The term "reflect" in examples includes reflection of at least a portion of incident radiation at a certain wavelength and is not limited to reflection of all incident radiation at that wavelength. The term "set of wavelengths" as used herein includes a set of one wavelength and, in examples, may refer to a range of wavelengths or multiple ranges of wavelengths which may be continuous or non-continuous.

Figure 2:
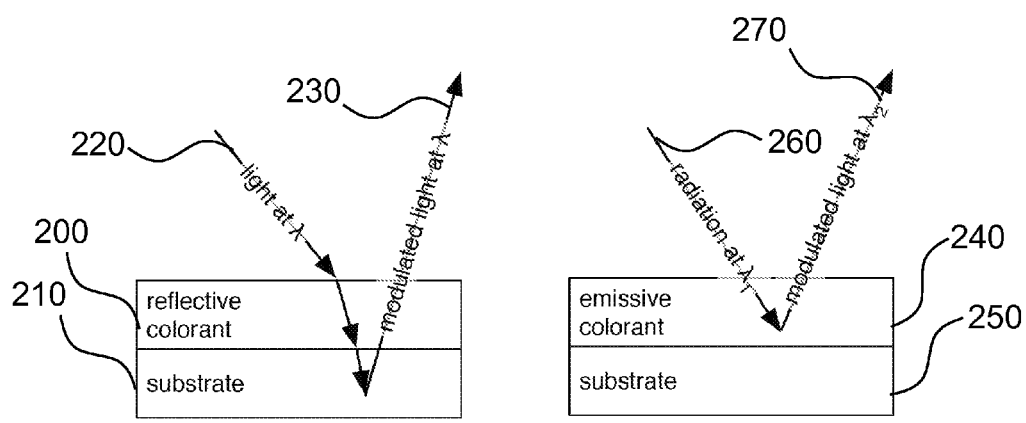
FIG. 2 is a schematic illustration showing a reflective colorant arranged on a substrate and an emissive colorant arranged on a substrate according to an example.

An example first colorant is illustrated schematically in FIG. 2, arranged on a substrate. In the example of FIG. 2, the first colorant 200, when arranged on a substrate 210, absorbs a portion of incident radiation 220 with a wavelength of $\lambda$ and reflects another portion of incident radiation 220 having the wavelength of $\lambda$ such that reflected radiation 230 leaves the substrate 210 with a wavelength $\lambda$. In this example, the wavelength $\lambda$ is representative of the first set of wavelengths. In examples described herein, the term "radiation" refers to electromagnetic radiation of any wavelength; electromagnetic radiation within the visible part of the electromagnetic spectrum is referred to herein as "light". In examples, the first colorant 200 reflects electromagnetic radiation having a wavelength within a given set or range of wavelengths, for example a range of wavelengths within the visible spectrum. In such examples, the first colorant 200 may absorb a portion of and reflect a different portion of light with a wavelength within that given range of wavelengths.

The first colorant may be a subtractive primary colorant, for example a cyan, magenta, yellow or black ink. In such examples, the first set of wavelengths reflected by the first colorant, e.g. the wavelengths that are reflected in particular proportions as opposed to being absorbed, is in a part of the visible spectrum corresponding to a subtractive primary color, i.e. one of cyan, magenta, yellow or black. In further examples, the first colorant is configured to reflect radiation having a first set of wavelengths lying anywhere in the visible spectrum, for example any wavelength within the range of 400 to 700 nanometers. As explained above, in some cases, the first set of wavelengths reflected by the first colorant may include a continuous or non-continuous set of wavelengths. In examples, the first colorant also reflects radiation with wavelengths which are not in the first set of wavelengths. For example, the portion of radiation reflected by the first colorant for wavelengths within the first set of wavelengths may be greater than the portion of radiation reflected by the first colorant for wavelengths outside the first set of wavelengths. At least a portion of radiation not reflected by the first colorant for a given wavelength of incident radiation may be absorbed. For example, the first colorant may be configured to absorb a set of wavelengths outside the first set of wavelengths and a first portion of incident radiation having the first set of wavelengths, and reflect a second portion of incident radiation having the first of wavelengths, the second portion being greater than the first portion. In this case, the proportion of radiation reflected by the first colorant with wavelengths in the first set of wavelengths is larger than the proportion of radiation absorbed. The first set of wavelengths may therefore include wavelengths at which the first colorant predominantly reflects incident radiation, for example at which it reflects more radiation than it absorbs, or at which it reflects more radiation than at other wavelengths. In any case a particular colorant may be defined by a reflectance spectrum that, for each wavelength in a given range such as the visible spectrum, has a reflectance value that is representative of the portion of incident radiation that is reflected, with the remaining portion being absorbed by one or more of the colorant and the substrate. In examples, the at least one first colorant is a reflective achromatic colorant, for example a black reflective colorant for use on a light, e.g. white, substrate, or a white reflective colorant for use on a dark, e.g. black, substrate.

In certain examples, the plurality of colorants also comprises at least one second colorant configured to absorb radiation having a second set of wavelengths and emit radiation having a third set of wavelengths, shown schematically in FIG. 2. In FIG. 2, an example second colorant 240, e.g. an emissive colorant, is illustrated arranged on a substrate 250. When the second colorant 240 is arranged on the substrate 250, incident radiation 260 with a set of wavelengths denoted $\lambda_1$ is absorbed by the second colorant 240 and light with a set of wavelengths denoted $\lambda_2$ is emitted by the second colorant 240.

In such examples, the second colorant may be configured to absorb energy from at least a portion of incident radiation having the second set of wavelengths and to emit at least a portion of the absorbed energy as radiation having the third set of wavelengths. In some cases, the second and third sets of wavelengths comprise different wavelengths. For example, the second colorant may absorb a certain proportion of incident photons, i.e. incident radiation, with wavelengths in the second set of wavelengths and then re-emit photons with different wavelengths, for example wavelengths in the third set of wavelengths. The total energy of the re-emitted photons in examples is less than or equal to the energy of the photons absorbed by the second colorant. The number of photons absorbed by the second colorant may be less than the number of photons incident on the second colorant. In this case, an emissive colorant may also be defined by a reflectance spectrum, however in certain portions of the spectrum a reflectance value for a given wavelength may exceed 100%, i.e. all incident radiation at that wavelength being reflected, due to emission at that wavelength, the energy for emission being absorbed in a wavelength range represented by the second set of wavelengths. In certain cases, an emissive colorant may also be defined by a general spectrum that indicates a modelled and/or measured intensity or power value for a given range of wavelengths.

The second colorant in certain examples comprises one or more additives that configure spectral properties of the second colorant, e.g. the measured spectrum when the second colorant is deposited on a substrate. The one or more additives may emit a narrow-band of specific wavelengths anywhere in the visible range of wavelengths when illuminated by electromagnetic radiation comprising particular wavelengths or wavelength ranges, including generic, common light sources. Incident light 260 may comprise one or more of light and non-visible radiation, e.g. ultra-violet radiation.

In certain cases, the second colorant comprises at least one quantum dot material. For example, the second colorant may comprise a quantum dot material component with a concentration of less than 1% by weight to around a few % by weight. Quantum dots comprise semi-conductor-like materials that may be configured and manufactured such that they exhibit narrow-band emission spectra within the visible range. These spectra may have a controlled peak location and a controlled full width at half maximum (FWHM). For example, quantum dots of the same material but different sizes may emit light in different wavelength ranges due to the quantum confinement effect. For certain materials, the larger the quantum dot the longer the wavelength of the spectral peak (e.g. the redder the perceived output); while the smaller the quantum dot the shorter the wavelength of the spectral peak (e.g. the bluer the perceived output). Quantum dots may range from 2 to 50 nm in size for certain materials and production techniques. In certain cases shell size may also be configured to affect the properties of the quantum dot. Quantum dots may also be configured to absorb radiation outside of the visible range, for example radiation in the ultra-violet or infra-red range. The size of the quantum dot may be chosen to absorb radiation at the second set of wavelengths and emit radiation at the third set of wavelengths.

In other examples, the second colorant comprises one or more of: a photoluminescent component, at least one quantum dot material, and at least one nanocrystal material. In certain cases, the second colorant may comprise any additive that provides narrow-band spectral emission or that absorbs electromagnetic radiation at one set of wavelengths and re-emits at least a portion of that radiation at another set of wavelengths. In other cases, the second colorant comprises a nanoparticle component which may have either upconverting or downconverting properties, i.e. it may absorb radiation at a given set of wavelengths and re-emit radiation at a set of wavelengths which is lower or higher than the radiation it absorbs, e.g. for upconverting and downconverting nanoparticle materials respectively.

The wavelength of the radiation absorbed by the second colorant in certain examples, i.e. the second set of wavelengths, is in the visible part of the electromagnetic spectrum, i.e. is "light". Therefore, in these cases, there is no need to illuminate the second colorant with a special type of radiation, for example radiation which is outside the visible spectrum such as ultra-violet or infra-red radiation, in order to obtain emission at the third set of wavelengths. In some cases, the second colorant is configured to absorb a plurality of wavelengths across a band or range of the electromagnetic spectrum, which band may be continuous or non-continuous. The first set of wavelengths may be the same as, or different from, one or more of the second and third sets of wavelengths. For example, one or more wavelengths in the first set of wavelengths may be in the third set of wavelengths, i.e. these one or more wavelengths may be in both the first and third sets of wavelengths. Likewise, the second set of wavelengths may be the same as, or different from, the third set of wavelengths.

The combination of colorants printed by a printing apparatus in a given area of a substrate in certain cases may comprise both the first colorant and the second colorant which for example may be a reflective colorant and an emissive colorant respectively. For example, the given area of the substrate may comprise an area of colorant overprint. In these examples, the radiation which leaves the substrate will comprise both reflected and emitted radiation. The reflected radiation in examples has a first set of wavelengths and the emitted radiation has a third set of wavelengths. In some cases, the first and the third sets of wavelengths are the same or are similar such that they would be perceived as the same color by a viewer. In other cases, the first set of wavelengths and the third set of wavelengths are different.

Figure 3:
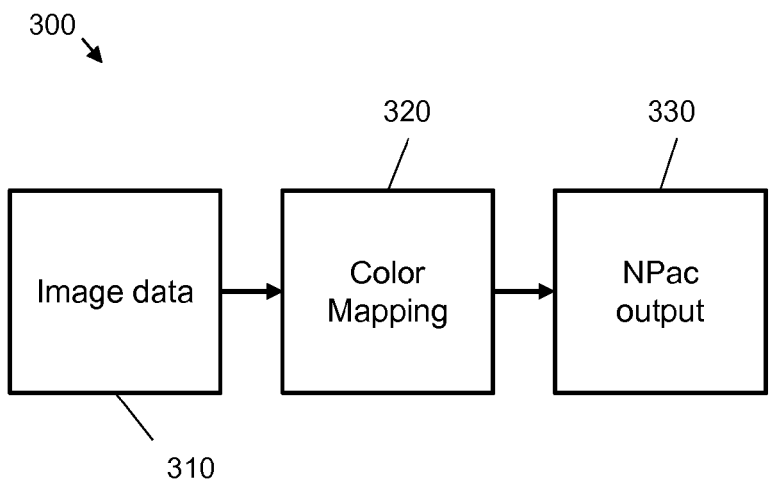
FIG. 3 is a schematic diagram of an image processing pipeline according to an example.

FIG. 3 shows an example of an image processing pipeline 300 for a printing apparatus comprising a first and a second colorant as described above. The image processing pipeline 300 receives image data 310 that is passed into a color mapping component 320. The image data 310 may comprise color data as represented in a first color space, such as pixel representations in an RGB-based color space. The color mapping component 320 maps the color data from the first color space to a second color space. The second color space in the image processing pipeline 300 comprises a Neugebauer Primary area coverage (NPac) color space. NPac color space is used as a domain within which a color mapping process and a halftoning process communicate, i.e. an output color is defined by an NPac value that specifies a particular area coverage of a particular colorant combination. In the image processing pipeline, a halftone image on a substrate comprises a plurality of pixels or dots wherein the spatial density of the pixels or dots is defined in NPac color space and controls the colorimetry of an area of the image, i.e. any halftoning process simply implements the area coverages as defined in the NPacs. As such, in the context of the image processing pipeline 300, the term "color separation", referring to an NPac output 330, combines elements of both a color mapping and halftoning process. An example of an imaging system that uses NPac values in image processing is a Halftone Area Neugebauer Separation (HANS) pipeline.

An NPac represents a distribution of one or more Neugebauer Primaries (NPs) over a unit area. For example, in a binary (bi-level) printer, an NP is one of $2^k$ combinations of k inks within the printing system. For example, if a printing device uses CMY inks there can be eight NPs. These NPs relate to the following: C, M, Y, C+M, C+Y, M+Y, C+M+Y, and W (white or blank indicating an absence of ink). In relation to the present examples a plurality of NPs for a given printing system may comprise an adapted colorant with reflective and/or emissive properties and its various combinations of overprints, e.g. with the other colorants of the printing system. In one case, there may be a plurality of colorants with reflective and/or emissive properties as described in examples herein. In yet a further case, all colorants within a printing system may have these properties. Other examples may also incorporate multi-level printers, e.g. where print heads are able to deposit N drop levels; in this case an NP may comprise one of $N^k$ combinations of k inks within the printing system. An NPac space provides a large number of metamers. Metamerism is the existence of a multitude of combinations of reflectance and emission properties that result in the same perceived color, as for a fixed illuminant and observer.

Although certain printing device examples are described with reference to one or more colorant levels, it should be understood that any color mappings may be extended to other colorants such as glosses and/or varnishes that may be deposited in a printing system and that may alter a perceived output color; these may be modelled as NPs.

Figure 4:
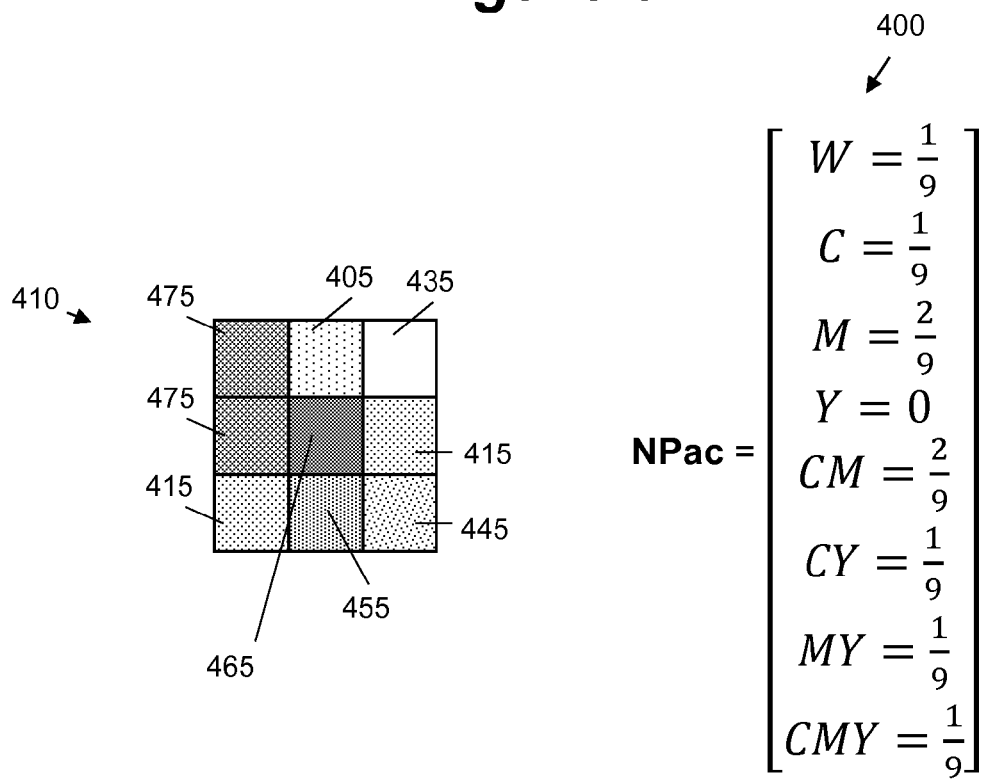
FIG. 4 is a schematic illustration of a Neugebauer Primary area coverage vector according to an example.

FIG. 4 shows an example of a three-by-three pixel area 410 of a print output where all pixels have the same NPac vector: vector 400. The NPac vector 400 defines the probability distributions for each NP for each pixel, e.g. a likelihood that NPx is to be placed at the pixel location. Hence, in the example print output there is one pixel of White (W) (435)—e.g. bare substrate; one pixel of Cyan (C) (405); two pixels of Magenta (M) (415); no pixels of Yellow (Y); two pixels of Cyan+Magenta (CM) (475); one pixel of Cyan+Yellow (CY) (445); one pixel of Magenta+Yellow (MY) (455); and one pixel of Cyan+Magenta+Yellow (CMY) (465). Generally, the print output of a given area is generated such that the probability distributions set by the NPac vectors of each pixel are fulfilled. As such, an NPac vector is representative of the ink overprint statistics of a given area. Any error between a proposed set of colorant distributions and a given set of pixels may be diffused or propagated to neighboring pixel areas, such that for a given group of pixels this error is minimized. Any subsequent processing effects the probability distributions, e.g. in any halftoning process. When used with the colorants of the present examples, one or more of the example CMY inks may comprise additives that provide emissive properties.

Figure 5:
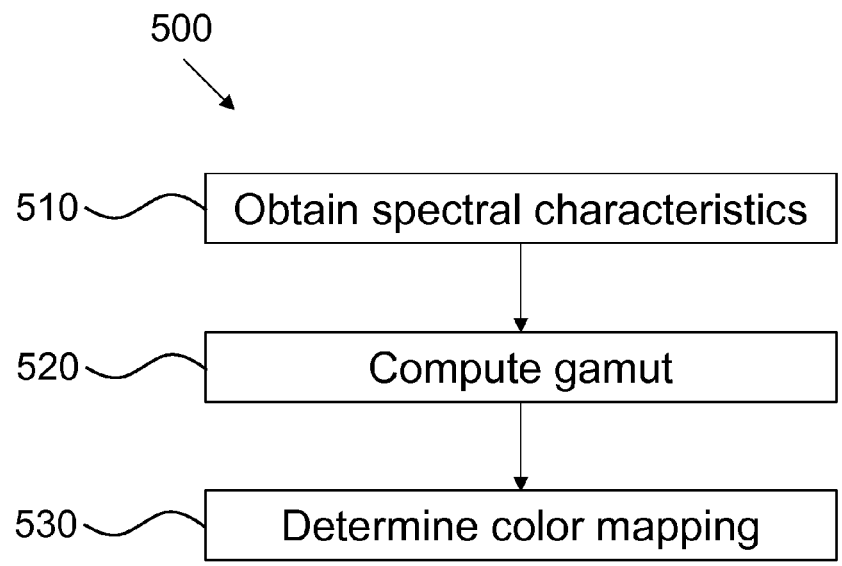
FIG. 5 is a flow chart showing a method for generating a color mapping according to an example.

FIG. 5 shows a method 500 for generating a color mapping for a printing apparatus including a plurality of colorants according to examples. At block 510 spectral characteristics are obtained for the plurality of colorants. The plurality of colorants includes at least one first and at least one second colorant according to examples described herein.

The term "spectral characteristics" includes any spectral property of a colorant, for example its reflectance or emission or any variation of a particular optical property which depends on the wavelength illuminating the colorant. Both emissive and absorptive properties may be obtained. This may be achieved through one or more of measurement and modelling. In one implementation, an ink template may be used. In this implementation, an image may be printed with a number of test patches. The test patches may comprise different distributions of each of the plurality of colorants. For example, each test patch may be printed based on a different NPac vector, i.e. with different proportions of different ink-overprints in a given area. In certain cases, at least some of the different ink-overprints comprise combinations of the first and second colorants. These ink-overprints have both reflective and emissive properties due to the first and second colorants respectively. After printing, the test patches are illuminated with a light source. The light source in certain examples produces electromagnetic radiation at a range of wavelengths and may be a generic, common light source. The range of wavelengths may be in the visible spectrum and, in further examples, includes the first and/or second sets of wavelengths the first and second colorants are configured to reflect and absorb radiation at, respectively. For example, the illumination may include illuminating the at least one second colorant with radiation having the second set of wavelengths.

The spectral properties of the illuminated test patches may then be measured, e.g. using a spectrometer or spectrophotometer, which may or may not form part of the printing apparatus. For example, the spectral characteristics may be measured by scanning the illuminated test patches between a predetermined range of wavelengths in a chosen number of steps. For example, a built-in spectrophotometer may be able to measure visible wavelengths, for example in the range 400 nm to 700 nm. Spectral characteristics may be obtained from a spectrum of a measured color. Measurements may be integrated across intervals of width, D, such that the number of intervals, N, equals the spectral range divided by D. In one example, the spectral range may be 400 nanometers to 700 nanometers and D may be 20 nanometers, resulting in values for 16 intervals. D may be configured based on the specific requirements of each example. Each value may be a value of reflectance, e.g. measured intensity, or a normalized reflectance/emission value. However, in this case, this reflectance value measures radiation both reflected and emitted by the custom colorants described herein. A reflectance value is an example of a "radiation value", which may refer to any value indicative of an amount of radiation either emitted or reflected by a colorant. In this case, as described above, a "radiation value" output by a spectrometer or spectrophotometer may exceed 100%. Spectral characteristics may include spectral properties of the printed inks such as the intensity of each wavelength measured for each test patch and this can take the form of a spectrum of wavelengths in which each test patch gives a different intensity response.

The device for measuring the spectral characteristics in examples allows for values, for example of the reflectance, which exceed the spectral characteristics of a perfect diffuser which reflects all light at each wavelength. For example, in typical surface color applications based on reflective color formation, materials can at most reflect all of the incident light at each wavelength. Therefore, for reflective colorants, a device for measuring the reflectance sets may limit measured reflectance values to 100%, i.e. to values that indicate a reflectance of no more than all the incident light at each wavelength being reflected, e.g. a reflectance value of 100%. For emissive colorants as described herein, a device for measuring the spectral characteristics may measure reflectance values that exceed 100%, i.e. which exceed the reflectance expected due to reflection of all incident light, due to the emissive properties.

In another implementation, values for spectral characteristics or properties may be obtained from an accessible resource, such as a network and/or storage device.

In certain examples, spectral characteristics are obtained for a plurality of colorant primaries, each colorant primary representing an available colorant overprint combination, by determining spectral characteristics for respective colorant primaries having one or more colorant coverage values for a unit area of a substrate. The colorants may have reflective and/or emissive properties as described herein. The plurality of colorant primaries in certain examples are each based on a different NPac vector comprising different proportions of different ink-overprints in a unit area, as explained above. For example, each colorant primary may be a Neugebauer Primary.

In examples, at least one of the available colorant overprint combinations is a combination of at least one of the at least one first colorant and at least one of the at least one second colorant. Therefore, in cases where the first colorant is a reflective colorant and the second colorant is an emissive colorant, at least one of the available overprint combinations, e.g. a Neugebauer Primary, is a combination of reflective and emissive colorants. At least one of the available colorant overprint combinations may not comprise the first colorant; for example, at least one of the available overprint combinations may comprise at least one second colorant only, e.g. it may comprise emissive colorants and not reflective colorants. In this case, this available overprint combination may correspond to an emissive Neugebauer Primary.

In certain cases, the spectral characteristics may only be measured for primary inks, where in examples the primary inks include a colorant according to examples. In these cases spectral characteristics for non-primary ink-overprints may be determined based on the spectral properties of the primary inks, e.g. using spectral modeling.

Certain examples include processing first spectral characteristics for the at least one first colorant and second spectral characteristics for the at least one second colorant thereby obtaining the spectral characteristics for the plurality of colorants. For example, for overprint combinations including at least one first and at least one second colorant, the first and second spectral characteristics may be combined to provide a measure of the overall spectral characteristics of those overprint combination.

In some cases, the first spectral characteristics for the at least one first colorant comprise at least one reflectance spectrum and the second spectral characteristics for the at least one second colorant comprise at least one emission spectrum. In such cases, the processing may include an unweighted or weighted addition of the first colorants' reflectance spectra to the second colorants' emission spectra to obtain the spectral characteristics of the combination of the first and second colorants. In certain cases, color models may only use a normalized "radiation value"; in this case the color models may be adapted to use a "radiation value" greater than 100% that comprises both reflective and emissive elements. In examples, the radiation value may be a reflectance value.

At block 520 a gamut of colors available to the printing apparatus in an output color space is computed based on the spectral characteristics of the plurality of colorants obtained at block 510. In certain cases, a set of computed colorant primary, e.g. NP, reflectance values may be visualized in an N-dimensional space referred to as spectral space. Spectral space is a mathematically-defined N-dimensional space in which each point in spectral space is defined by an N-dimensional co-ordinate. In this case each co-ordinate value is a reflectance value for a particular wavelength interval (e.g. a sampled spectrum value). Hence, a set of reflectance values for a particular NP represents a point in the N-dimensional space. The space between the reflectances values for the given NPs can be interpolated to obtain any reflectance enclosed by their convex hull, since each point within that hull is a convex combination of some of the NPs delimiting it. The reflectances enclosed within the convex hull, for example within a given output color space correspond with the gamut of colors available to the printing apparatus in that output color space.

In a method of generating a color mapping according to examples herein, the gamut of colors available to the printing apparatus incorporates radiation values that exceed a radiation value indicative of all incident radiation being reflected. The term radiation value is used in this context to refer to the properties or characteristics of the proportion of light that leaves an object and includes both light reflected from the object and light emitted from the object, and may be a reflectance or a normalized reflectance. An example may include a recorded spectrum, such as a spectrum indicating an optical property corresponding to a plurality of detectors at number of sampled wavelengths. For example, a radiation value may comprise the number of photon counts falling on a photon detector at a particular wavelength relative to the number of photons reflected by a perfect diffuser illuminated by the same photon source.

In examples in which the first and the third sets of wavelengths are the same, i.e. the first colorant reflects radiation at the same wavelengths as the wavelengths of radiation emitted by the second colorant, the amount of radiation reflected and emitted by a combination of the first and second colorants within the first set of wavelengths may, in examples, be greater than the reflectance of a perfect diffuser which reflects all radiation at each wavelength or greater than the amount of light reflected by the substrate without the colorants arranged on it. In the above-described examples, the term "reflectance" may refer to a normalized reflectance. With a known reflective colorant, the normalized reflectance has a value between 0 and 1 (i.e. between 0 and 100%). However, as explained above, the reflectance of a combination of the first and second colorants may have a normalized reflectance outside this range, e.g. the normalized reflectance of the combination of the first and second colorants may be larger than 1 (i.e. greater than 100%).

In a known method of generating a color mapping, ink limits are applied to reduce the gamut to a gamut comprising reflectances which are printable by the printing device. For example, ink limits may be applied to remove reflectances which exceed a radiation value, for example a reflectance value, indicative of all incident radiation being reflected as it is not possible to achieve such a reflectance value with known reflective inks. The gamut of colors available to the printing apparatus according to examples described herein may incorporate radiation values that exceed a radiation value indicative of all incident radiation being reflected, as described above. Therefore, the method of color mapping according to certain examples does not include applying such ink limits, or the ink limits applied are modified to include radiation values outside the 0% and 100% range imposed with conventional ink limits.

In certain examples in which spectral characteristics are obtained for a plurality of colorant primaries, the computing the gamut of colors may include modelling the gamut of colors available based on the plurality of colorant primaries. For example, the Kubelka-Munk model may be used to predict the reflectance of first colorants, e.g. reflective colorants, or a stack of overprinted first colorants. The Yule-Nielsen model may also be used, as well as a Neugebauer model that includes the colorant primaries. This involves using the reflectivity and opacity parameters characterizing an ink's mixing properties to calculate its reflectance. Reflectances modelled in this way may then be combined with the second colorant's emissive contribution to obtain a reflectance for an overprinted combination of first and second colorants (where "reflectance" in this case refers to an amount of radiation leaving a substrate due to a combination of reflection and emission from the first and second colorants). As explained above, this combination may be performed by adding contributions from the first and second colorant, for example by performing an addition of spectral characteristics for the first and second colorants.

At block 530 a color mapping is determined that enables a mapping of color values from an input color space to the output color space described above. For example, the computed gamut as described above may be used to provide a mapping of spectral characteristics corresponding to sampled colors within an input color space to one or more colorant coverage values for a unit area of a substrate, e.g. an NPac, within an output color space. In one case, the color mapping may comprise a color separation in the form of a look-up table that maps from input colorimetry to NPac vectors based on NPs which may be composed of a plurality of emissive inks or reflective and emissive inks stacked on top of each other. In certain cases, there may be a multitude of NPacs that correspond to any one ink-vector as used by comparative printing systems. Each of these NPacs however has a different combination of reflectance and colorimetry and therefore gives access to a much larger variety or printable gamut. For example, multiple NPacs may have the same colorimetry (being that colorimetry's metamers) while differing in spectral reflectance. There may also be multiple NPacs with the same reflectance but with different use of the available NPs.

By using first and second colorants, which reflect and emit radiation respectively in examples, the printable color gamut is larger than that obtained using merely reflective colorants, as will now be explained with reference to FIGS. 6A, 6B and 6C. As explained above, the first colorant in examples is a reflective ink and the second colorant is an emissive ink; references below to a reflective ink and an emissive ink should be construed accordingly.

Figure 6A:
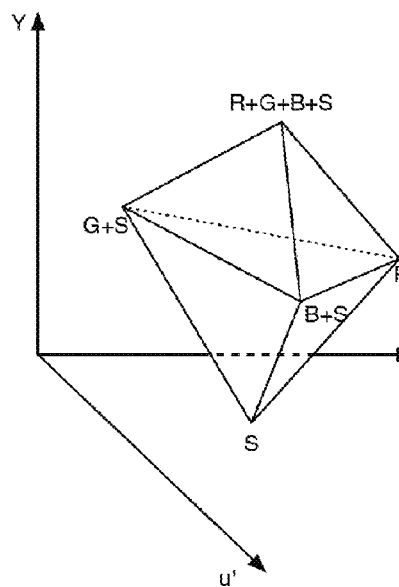
FIG. 6A is a schematic illustration showing a gamut in Yu'v' color space for a printing apparatus comprising emissive colorants according to an example.

FIG. 6A is a schematic illustration of a color gamut in Yu'v' color space for a printing apparatus comprising emissive colorants, e.g. a plurality of second colorants. In this example, the printing apparatus comprises red, green and blue inks (denoted R, G and B respectively in the Figure) which have emissive peaks in the parts of the visible range of the electromagnetic spectrum which appear red, green and blue respectively to an observer. In other examples, emissive inks with hues which differ from red, green and blue, for example orange or violet, may be used instead of or in addition to red, green and blue inks. S represents the contribution of the substrate the inks are printed on. Emissive inks add light to the light reflected from a substrate. Therefore, when used on their own, they are most suitable for printing onto dark substrates, e.g. substrates with a black or dark, chromatic color.

Figure 6B:
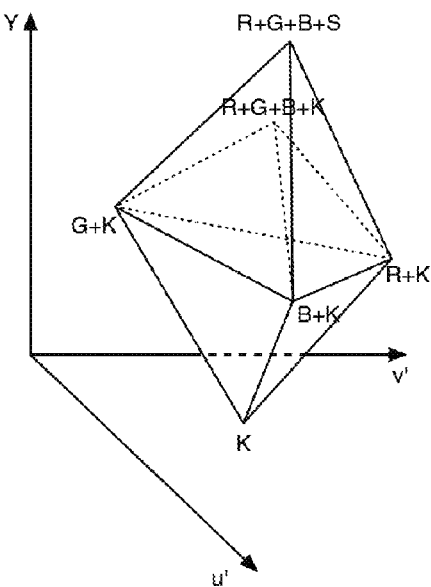
FIG. 6B is a schematic illustration showing a gamut in Yu'v' color space for a printing apparatus comprising emissive colorants and a reflective black colorant according to an example.

FIG. 6B shows schematically a color gamut in Yu'v' color space for a printing apparatus comprising a plurality of emissive inks and a reflective achromatic ink, according to examples. As for FIG. 6A, the red, green and blue inks and the substrate are denoted R, G, B and S respectively; the reflective achromatic ink is denoted K. As explained above, dark, e.g. black, reflective inks are most suitable for printing on a light, e.g. white substrate, as the dark reflective ink provides a base gray level to which the emissive inks add emitted radiation. In this example, the reflective achromatic ink is a black reflective ink. The printable output using this black ink is similar to that obtained using conventional black inks with 100% gray component replacement (i.e. there using a black ink instead of a combination of CMY inks to obtain a black output, while here using K to provide a level of luminance to which RGB can be added more efficiently). The resulting color gamut is determined by the emissive inks in terms of chromaticity and by the reflective black ink in terms of the densest, darkest color obtainable, as can be seen in FIG. 6B. FIG. 6B also shows that, for RGB inks, the gamut is triangular in CIE u'v' chromaticity terms, extending down linearly to the tristimulus values of the reflective black ink. Therefore, the color gamut forms an irregular hexahedron, with white above and black below the triangle formed by the RGB inks.

In other examples in which the substrate is dark, e.g. black, a light, e.g. white, reflective ink may be used in combination with a set of emissive inks. In such examples, the white reflective ink may be used instead of the emissive inks to obtain the lightest printable color. The darkest color obtainable will be the substrate itself.

Figure 6C:
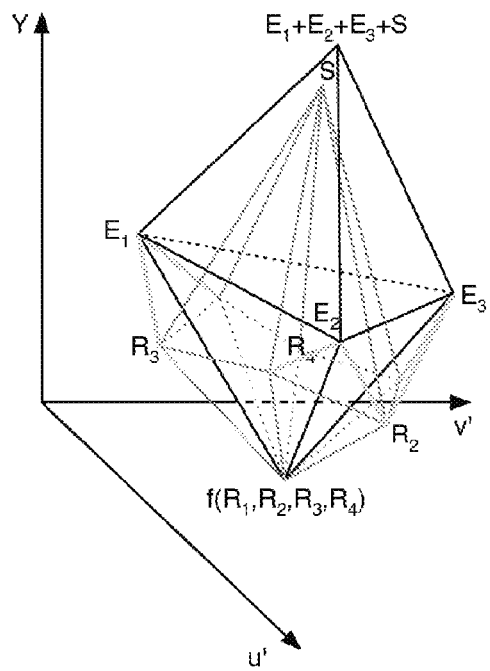
FIG. 6C is a schematic illustration showing a gamut in Yu'v' color space for a printing apparatus comprising emissive and reflective colorants according to an example.

FIG. 6C illustrates schematically a color gamut in Yu'v' color space for an example printing apparatus comprising a plurality of emissive inks and a plurality of reflective inks. The printable color gamut for this printing apparatus benefits from the different shapes of subtractive gamuts (e.g. for first or reflective colorants) and emissive gamuts (e.g. for second or emissive colorants) because, using the method of generating a color mapping according to examples herein, the printable gamut extends to those points enclosed within the convex hull between the gamuts of the reflective and emissive inks and is not merely a sum of the two gamuts.

Therefore, the color gamut obtained for a printing apparatus with at least one first colorant and at least one second colorant using the method of generating a color mapping according to examples is larger than that obtainable using comparative sets of colorants and associated methods.

Using either emissive-only inks or a set of emissive inks in combination with a reflective achromatic ink, the resulting color gamut is similar to that of a display. Therefore, with appropriately chosen inks, for example emissive RGB inks, it may be possible to print images in a standard RGB color space (sRGB), the Adobe RGB color space or another well-defined reference RGB color space either without applying a color mapping or with a simple rescaling. Furthermore, in examples using a set of reflective and emissive inks it may be possible to obtain printed images with a gamut exceeding that of displays.

Comparing FIGS. 6A and 6B, it can be seen that by adding a reflective achromatic ink to a set of emissive inks, the printable color gamut is increased. The reflective achromatic and emissive ink set also has a larger color gamut than may be obtained using conventional reflective inks. Moreover, use of a reflective achromatic ink or a set of reflective inks in combination with emissive inks in examples, for example as shown in FIGS. 6B and 6C, is more ink-efficient than printing using only reflective inks. For example, a smaller amount of ink is required to achieve the same printed color, as perceived by a viewer.

The input color space in certain cases is a device-dependent color space. For example, the input color space may comprise a Red, Green, Blue (RGB) color space, a Cyan, Magenta, Yellow and Black (CMYK) color space, or a CIE XYZ color space. In contrast, the output color space may be a device-independent color space, e.g. a CIELAB space. Therefore, the above-described method may be used to map colors to a device-independent color space such that the colors printed using the mapping method will be visually the same regardless of the printing device they are printed by.

Further examples relate to an imaging system for a printing apparatus including a plurality of colorants including at least one first colorant and at least one second colorant according to the examples described above. The imaging system in examples comprises a look-up table comprising a plurality of nodes, each node being configured to map a color value from an input color space to an output color space. The imaging system is arranged to process an input image using the look-up table and generate a halftone output comprising a color value in the output color space. The halftone output is indicative of an amount to be printed on a substrate of one of the at least one first colorant and the at least one second colorant, or the at least one second colorant. In these cases, the imaging system is therefore arranged to print a halftone output comprising either a combination of the first and second colorants, for example a combination of reflective and emissive colorants, or a combination of a plurality of second colorants, for example a combination of a plurality of emissive colorants. In examples, the output color space represents one or more colorant coverage values for a unit area of the substrate, for example one or more Neugebauer Primary area coverage vectors.

The look-up table in examples may be used to map an input color in a device-dependent color space, e.g. RGB, to an NPac vector which may be used to provide a certain print output. Such a look-up table may be accessed using printing workflows, for example within a HANS pipeline. It should be noted that the color mapping methods and colorant sets described herein may be used together or individually, e.g. independently.

Figure 7:
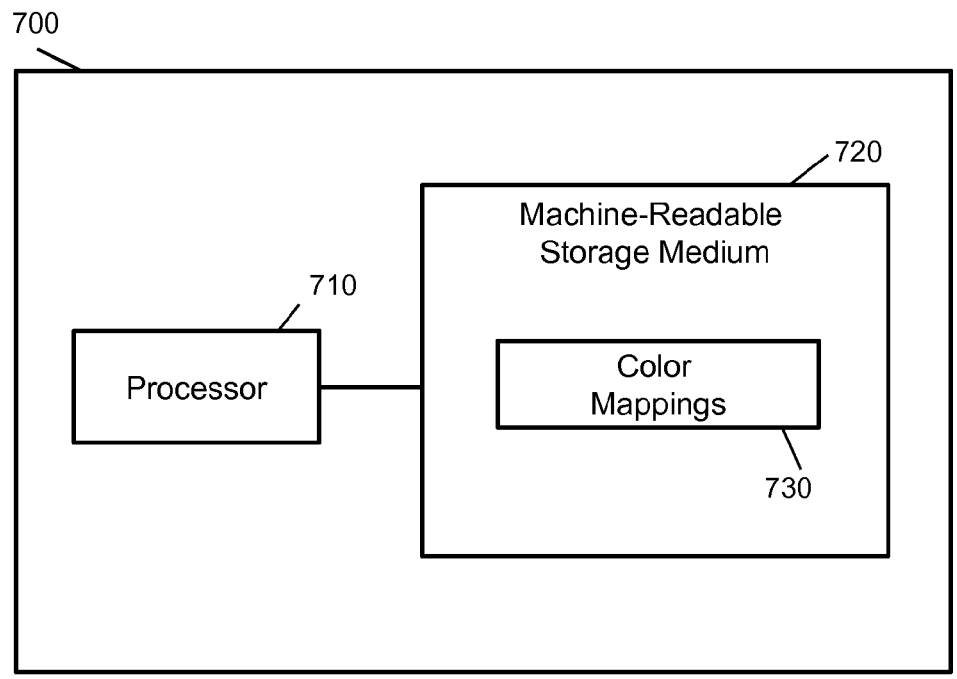
FIG. 7 is a schematic illustration of an imaging system according to an example.

Certain methods and systems as described herein may be implemented by a processor that processes computer program code that is retrieved from a non-transitory storage medium. An example imaging system in accordance with the above-described examples is illustrated in FIG. 7. The imaging system 700 comprises a machine-readable storage medium 720 coupled to a processor 710. In examples the imaging system 700 comprises a printer. Machine-readable media 720 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 7, the machine-readable storage medium comprises one or more color mappings 730, which may be in the form of a look-up table.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
obtaining, by a system comprising a processor, spectral characteristics of a plurality of colorant Neugebauer Primaries, each respective colorant Neugebauer Primary of the colorant Neugebauer Primaries representing a respective combination of a plurality of colorants, the plurality of colorants including a first reflective colorant configured to reflect radiation having a first set of wavelengths and a second emissive colorant configured to absorb radiation having a second set of wavelengths and emit radiation having a third set of wavelengths;
computing, by the system, a gamut of colors available to a printing apparatus in an output color space based on the spectral characteristics of the plurality of colorants;
generating, by the system using the gamut of colors available to the printing apparatus based on the spectral characteristics of the plurality of colorants including the first reflective colorant and the second emissive colorant, a color mapping that maps color values from an input color space to the output color space that comprises a Neugebauer Primary area coverage (NPac) color space; and
providing, by the system, the color mapping to the printing apparatus to produce a print output using the color mapping.

2. The method of claim 1, wherein the computing of the gamut of colors includes incorporating radiation values that exceed a radiation value indicative of all incident radiation being reflected using the plurality of colorants.

3. The method of claim 1,
wherein the first reflective colorant is configured to absorb a set of wavelengths outside the first set of wavelengths and is configured to absorb a first portion of incident radiation having the first set of wavelengths and reflect a second portion of the incident radiation having the first set of wavelengths, the second portion being greater than the first portion, and
wherein the second emissive colorant is configured to absorb energy from a portion of incident radiation having the second set of wavelengths and to emit a portion of the energy as the radiation having the third set of wavelengths,
the second and third sets of wavelengths comprising different wavelengths.

4. The method of claim 1, wherein a wavelength in the first set of wavelengths is in the third set of wavelengths.

5. The method of claim 1, wherein the respective combination of the plurality of colorants is a respective colorant overprint combination of a plurality of colorant overprint combinations, the respective colorant overprint combination comprising a first deposited colorant overprinted with a second deposited colorant by the printing apparatus.

6. The method of claim 5, wherein one of the plurality of colorant overprint combinations does not comprise the first reflective colorant.

7. The method of claim 1, wherein the computing of the gamut of colors includes modelling the gamut of colors available based on the plurality of colorant Neugebauer Primaries.

8. The method of claim 7, wherein the modelling includes using one or more of Neugebauer, Yule-Nielsen and Kubelka-Munk models.

9. The method of claim 1, wherein the input color space comprises a Red, Green, Blue (RGB) color space, a Cyan, Magenta, Yellow and Black (CMYK) color space, or a CIE XYZ color space.

10. The method of claim 1, wherein the first reflective colorant is a reflective achromatic colorant.

11. The method of claim 1, further comprising printing, by the printing apparatus using the color mapping, the print output on a substrate.

12. A system comprising:
at least one processor;
a non-transitory storage medium storing instructions that are executable on the at least one processor to:
obtain spectral characteristics of a plurality of colorant Neugebauer Primaries, each respective colorant Neugebauer Primary of the colorant Neugebauer Primaries representing a respective combination of a plurality of colorants based on test patches printed on a substrate using the plurality of colorants, the plurality of colorants including a first reflective colorant configured to reflect radiation having a first set of wavelengths and a second emissive colorant configured to absorb radiation having a second set of wavelengths and emit radiation having a third set of wavelengths;

compute a gamut of colors available to a printing apparatus in an output color space based on the spectral characteristics of the plurality of colorants; and generate, using the computed gamut incorporating radiation values that exceed a radiation value indicative of all incident radiation being reflected using the plurality of colorants, a color mapping that maps color values from an input color space to the output color space that comprises a Neugebauer Primary area coverage (NPac) color space; and a fluid applicator to dispense a printing fluid to form a print output produced according to the color mapping.

13. The system of claim 12,
wherein the first reflective colorant is configured to absorb a set of wavelengths outside the first set of wavelengths and is configured to absorb a first portion of incident radiation having the first set of wavelengths and reflect a second portion of the incident radiation having the first set of wavelengths, the second portion being greater than the first portion, and wherein the second emissive colorant is configured to absorb energy from a portion of incident radiation having the second set of wavelengths and to emit a portion of the energy as the radiation having the third set of wavelengths, the second and third sets of wavelengths comprising different wavelengths.

14. The system of claim 12, wherein the respective combination of the plurality of colorants is a respective colorant overprint combination of a plurality of colorant overprint combinations, the respective colorant overprint combination comprising a first deposited colorant overprinted with a second deposited colorant by the printing apparatus.

15. The system of claim 12, wherein the fluid applicator comprises a printhead.

16. A non-transitory storage medium storing instructions that upon execution cause a system to:
obtain spectral characteristics for a plurality of colorant Neugebauer Primaries, each respective colorant Neugebauer Primary of the colorant Neugebauer Primaries representing a respective combination of a plurality of colorants based on test patches printed on a substrate using the plurality of colorants, the plurality of colorants including a first reflective colorant configured to reflect radiation having a first set of wavelengths and a second emissive colorant configured to absorb radiation having a second set of wavelengths and emit radiation having a third set of wavelengths;

compute a gamut of colors available to a printing apparatus in an output color space based on the spectral characteristics of the plurality of colorants;

generate, using the gamut of colors available to the printing apparatus based on the spectral characteristics of the plurality of colorants including the first reflective colorant and the second emissive colorant, a color mapping that maps the spectral characteristics corresponding to sampled color values within an input color space to the output color space that comprises a Neugebauer Primary area coverage (NPac) color space; and provide the color mapping to the printing apparatus to produce a print output using the color mapping.

17. The non-transitory storage medium of claim 16, wherein the respective combination of the plurality of colorants is a respective colorant overprint combination of a plurality of colorant overprint combinations, the respective colorant overprint combination comprising a first deposited colorant overprinted with a second deposited colorant by the printing apparatus.

18. The non-transitory storage medium of claim 16, wherein the instructions upon execution cause the system to control printing, by the printing apparatus using the color mapping, the print output on a substrate.

* * * * *